United States Patent
Nakagawa et al.

(10) Patent No.: US 6,754,309 B2
(45) Date of Patent: Jun. 22, 2004

(54) COMMUNICATION DEVICE AND ACCESS NETWORK DEVICE

(75) Inventors: Shuichi Nakagawa, Kawasaki (JP); Hiroyuki Asano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/308,260

(22) Filed: Nov. 26, 2002

(65) Prior Publication Data

US 2003/0076931 A1 Apr. 24, 2003

Related U.S. Application Data

(63) Continuation of application No. PCT/JP00/03627, filed on Jun. 2, 2000.

(51) Int. Cl.[7] ............ H04M 1/24; H04M 3/08; H04M 3/22
(52) U.S. Cl. .............. 379/27.01; 379/22.04; 379/28; 379/24; 379/30; 379/29.03
(58) Field of Search ................. 379/1.03, 1.04, 379/9.02, 10.01, 22, 22.03, 22.04, 27.01, 27.04, 28, 29.05, 29.01, 29.03

(56) References Cited

U.S. PATENT DOCUMENTS

| | | | | |
|---|---|---|---|---|
| 4,670,898 A | * | 6/1987 | Pierce et al. | |
| 5,187,705 A | * | 2/1993 | Mano | |
| 5,442,621 A | * | 8/1995 | Ise et al. | |
| 5,802,143 A | * | 9/1998 | Borchering et al. | |
| 5,937,033 A | * | 8/1999 | Bellows | |

FOREIGN PATENT DOCUMENTS

| | | |
|---|---|---|
| JP | 62-68355 | 3/1987 |
| JP | 1-190159 | 7/1989 |
| JP | 3-35649 | 2/1991 |
| JP | 3-237849 | 10/1991 |
| JP | 04046446 | 2/1992 |
| JP | 4-122162 | 4/1992 |
| JP | 5-236105 | 9/1993 |
| JP | 10-290290 | 10/1998 |
| JP | 11-289565 | 10/1999 |

* cited by examiner

Primary Examiner—Duc Nguyen
(74) Attorney, Agent, or Firm—Katten Muchin Zavis Rosenman

(57) ABSTRACT

Line states are detected accurately to efficiently test subscriber lines, thereby improving the reliability and quality of maintenance and operation. Line monitoring means monitors line states based on at least one of loop information of lines and status information of bearer channels. Subscriber line testing means conducts subscriber line testing in accordance with the line states.

8 Claims, 4 Drawing Sheets

Ta TABLE

| | Loop Information (T1) | Status Information (T2) | Line State (T3) |
|---|---|---|---|
| #1 | Open | 0 | Idle |
| #2 | Close | 1 | Busy (Engaged) |
| #3 | Close | 0 | Off-hook or Shorted |
| #4 | Open | 1 | Busy (Ringing) |

Td TABLE

| | Status Information (T2) | Line State (T3) |
|---|---|---|
| #5 | 0 | Idle, Off-hook or Shorted |
| #6 | 1 | Busy (Engaged) or Busy (Ringing) |

Ta TABLE

| | Loop Information | Status Information | Line State |
|---|---|---|---|
| #1 | Open | 0 | Idle |
| #2 | Close | 1 | Busy (Engaged) |
| #3 | Close | 0 | Off-hook or Shorted |
| #4 | Open | 1 | Busy (Ringing) |

FIG. 2(A)

Td TABLE

| | Status Information | Line State |
|---|---|---|
| #5 | 0 | Idle, Off-hook or Shorted |
| #6 | 1 | Busy (Engaged) or Busy (Ringing) |

FIG. 2(B)

COMMUNICATION DEVICE AND ACCESS NETWORK DEVICE

This application is a continuing application, filed under 35 U.S.C. §111(a), of International Application PCT/JP00/03627, filed Jun. 2, 2000.

BACKGROUND OF THE INVENTION

1. Field of the Invention

The present invention relates to a communication device and an access network device, and more particularly, to a communication device for testing subscriber lines and an access network device having a V5 interface and capable of testing subscriber lines.

2. Description of the Related Art

With the recent popularization of the Internet etc., data communications via telephone lines have come to be used more and more widely, with the result that telephone lines are continuously used regardless of the daytime or nighttime.

Under such circumstances, in order to provide high-reliability services, it is necessary that subscriber lines be efficiently tested to quickly and accurately locate faulty spots.

Faults of subscriber lines for analog telephones could hitherto be discovered only on the following occasions: First, after a complaint is received from a customer using a faulty line, the fault is ascertained by a subscriber line test; secondly, faults are discovered by subscriber line testing which is periodically conducted on idle lines (free lines) during a period of time in which the usage ratio of lines is low, such as in the nighttime. Accordingly, line faults could not be discovered early.

On the other hand, where subscriber line testing is conducted on ISDN lines, the lines need to be once set in maintenance mode to thereby restrain call origination and call acceptance. A problem, however, arises in that when the lines are set in maintenance mode, a line through which data is being communicated can possibly be disconnected by mistake.

SUMMARY OF THE INVENTION

The present invention was created in view of the above circumstances, and an object thereof is to provide a communication device which is capable of accurately detecting line states and efficiently testing subscriber lines and thus is improved in reliability and quality of maintenance and operation.

Another object of the present invention is to provide an access network device which is capable of accurately detecting line states and efficiently testing subscriber lines and thus is improved in reliability and quality of maintenance and operation.

To achieve the above objects, the present invention provides a communication device 1 for testing subscriber lines, as shown in FIG. 1, which comprises line monitoring means 11 for monitoring line states based on at least one of loop information of lines and status information of bearer channels, and subscriber line testing means 12 for conducting subscriber line testing in accordance with the line states.

The line monitoring means 11 monitors line states based on at least one of the loop information of lines and the status information of bearer channels. The subscriber line testing means 12 conducts subscriber line testing in accordance with the line states.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 2 illustrates line states, wherein FIG. 2(A) is a diagram showing line states of an analog telephone, and FIG. 2(B) is a diagram showing line states of a digital telephone;

DESCRIPTION OF THE PREFERRED EMBODIMENTS

Figure 1:
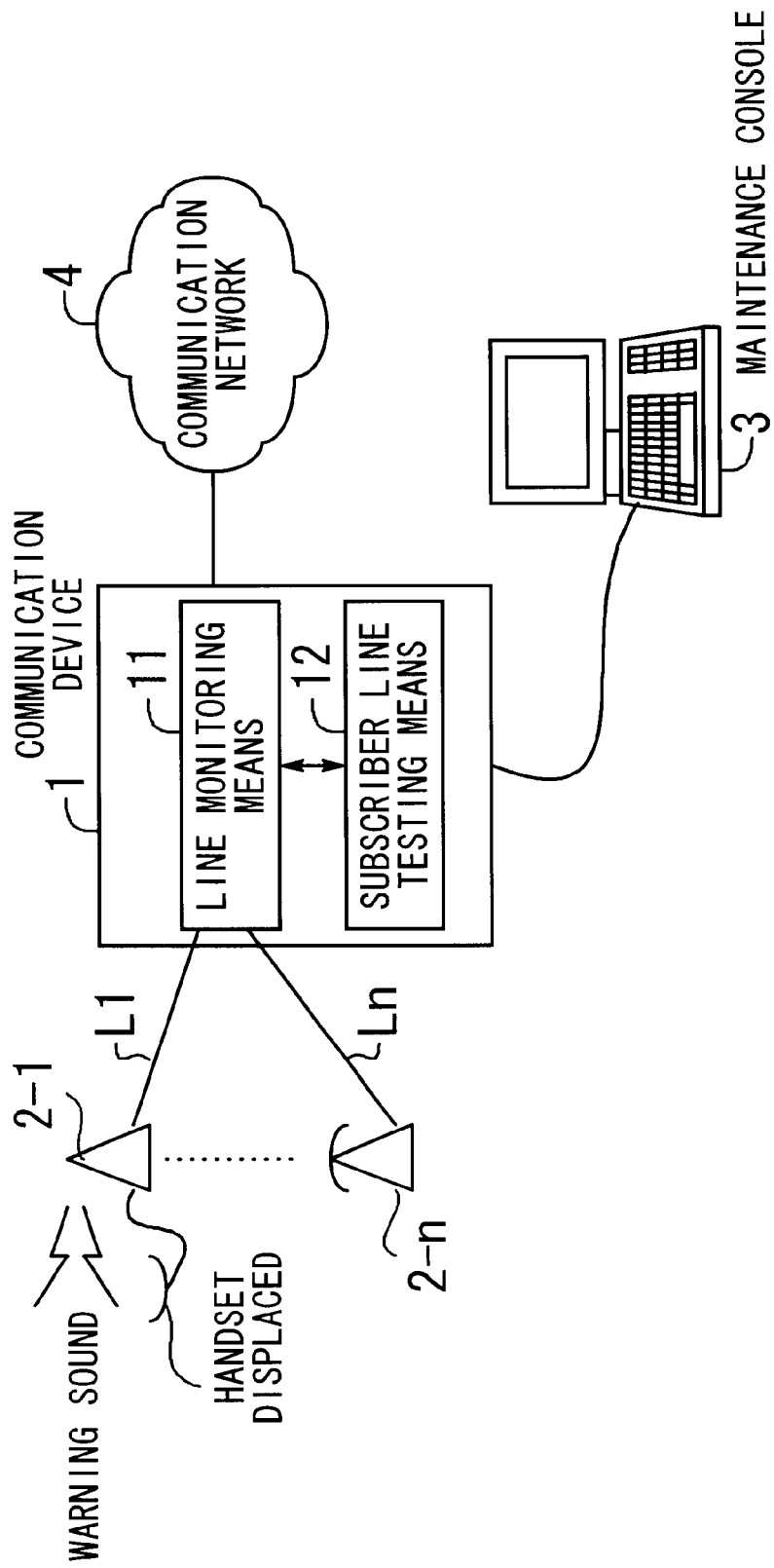
FIG. 1 is a diagram illustrating the principle of a communication device according to the present invention.

Embodiments of the present invention will be hereinafter described with reference to the drawings. FIG. 1 illustrates the principle of a communication device according to the present invention. The communication device 1 is connected with subscriber terminals (hereinafter referred to, by way of example, as telephones) 2-1 to 2-n via lines L1 to Ln, respectively. The communication device 1 is also connected to a maintenance console 3 for setting/controlling subscriber line testing and displaying the results of subscriber line testing, as well as to a communication network 4 including exchanges.

Line monitoring means 11 monitors line states based on at least one of loop information of lines and status information of bearer channels.

The loop information of lines is information indicating connected (Close)/released (Open) states of the individual lines, and the status information of bearer channels is information indicating connected (1)/released (0) states of the individual bearer channels (speech channels).

The connected state of line is a line state in which the handset of an analog telephone, among the telephones 2-1 to 2-n, is off the hook (OFF-HOOK). The released state of line is a line state in which the handset of the analog telephone is on the hook (ON-HOOK).

The connected state of bearer channel is a state in which a link to a bearer channel is established, and the released state of bearer channel is a state in which no link to a bearer channel is established.

Subscriber line testing means 12 conducts subscriber line testing in accordance with the line states monitored by the line monitoring means 11. Specifically, for analog telephones among the telephones 2-1 to 2-n, the subscriber line testing means 12 conducts subscriber line testing in accordance with the line states that reflect the loop information of lines and the status information of bearer channels. Also, for digital telephones among the telephones 2-1 to 2-n, the subscriber line testing means 12 conducts subscriber line testing in accordance with the line states that reflect the status information of bearer channels. Details will be described later with reference to FIG. 2.

If, as a result of the subscriber line testing, a telephone (in the figure, the telephone 2-1) whose handset is in a displaced state (continuance of the off-hook state for more than a fixed time without a call) is detected among the telephones 2-1 to 2-n, the subscriber line testing means 12 performs a control for emitting a warning sound from the telephone 2-1.

Further, the line monitoring means 11 and the subscriber line testing means 12 automatically repeat a series of processes including the line state monitoring by the line monitoring means 11, the subscriber line testing by the subscriber line testing means 12, and storage of the results of the subscriber line testing.

Specifically, the line states are monitored to distinguish lines (engaged lines) with respect to which the subscriber line testing should be deferred from lines (Idle lines or faulty lines) on which the subscriber line testing is to be conducted. The subscriber line testing is conducted on testable lines, and the results of the subscriber line testing are stored. This sequence of processes is automatically repeated at regular intervals. The settings for these processes can be made by the operator through the maintenance console 3.

Line states will be now explained. FIG. 2 illustrates line states, wherein FIG. 2(A) shows line states of an analog telephone, and FIG. 2(B) shows line states of a digital telephone. A table Ta shown in FIG. 2(A) has three fields for the loop information T1 of line, the status information T2 of bearer channel, and the line state T3. For analog subscriber lines, the line monitoring means 11 usually monitors the process of transition of four states #1 to #4 in the table Ta.

In the state #1 in which the line is not in use, the handset of the telephone is on the hook, and thus the loop information T1 indicates "Open". Since a bearer channel to be allocated to the line is also in the released state, the status information T2 shows "0". Accordingly, the line state T3 is judged "Idle".

In the state #2 in which a call is under way via the line, the handset of the telephone is off the hook, and therefore, the loop information T1 indicates "Close". Also, when the subscriber is calling, a bearer channel is always connected, so that the status information T2 changes to "1". Accordingly, if this state continues, then a call is normally established via the subscriber line, and in this case, the line state T3 is judged "Busy (Engaged)".

In the state #3, the loop information T1 is "Close" and the status information T2 is "0". In cases where the subscriber line continuously remains in this line state T3, there is a possibility that the handset is continuously kept off the hook (displaced) or that the subscriber line is short-circuited (shorted) because of a physical fault.

In the state #4 in which the telephone is ringing on the call receiving side of the subscriber line, the status information T2 changes to "1" because a bearer channel is connected to the subscriber line, but the loop information T1 is "Open" since the handset of the telephone is not lifted off the hook yet. Consequently, the line state T3 is judged "Busy (Ringing)".

When the called subscriber answers the telephone by lifting the handset off the hook, the state #4 changes to the state #2. When the call terminates and the handset is put back on the hook, the bearer channel is released, so that the line state changes to the state #1.

If an analog line is found to be in the state #3, among the states #1 to #4 explained above, in which the loop information T1 is "Close" and the status information T2 is "0", it is judged that some fault has possibly occurred in such an analog line.

Thus, if, during the monitoring of lines by the line monitoring means 11, the state #3 is detected, the line in this state is instantly recognized as a faulty line, whereby line faults can be discovered early.

In the case of analog telephones, lines on which the subscriber line testing can be conducted are those in the state #1 or #3. For the subscriber lines in the state #2 or #4, the testing is deferred.

On the other hand, in the case of digital telephones, the line monitoring means 11 usually monitors the process of transition of two states #5 and #6 in the table Td shown in FIG. 2(B). For digital subscriber lines, it is not possible to detect the line connected/released state based on the on-hook/off-hook state of the handset; therefore, whether the subscriber line testing can be conducted or not is determined based solely on the status information T2.

Accordingly, in the case of digital telephones, lines on which the subscriber line testing can be conducted are those in the state #5. For the lines in the state #6, the testing is deferred.

The above explanation is directed to the monitoring of line states and subscriber line testing that reflect the loop information of lines and the status information of bearer channels. In cases where a line being monitored shows an apparently abnormal voltage because of contact with another electric wire, telephone failure or some other cause, such a line is instantly judged faulty and the subscriber line test is conducted.

An access network device with a V5 interface, to which the communication device 1 of the present invention is applied, will be now described. As internationally standardized interfaces for data communications over telephone networks, V series interfaces are known which are recommended and prescribed by ITU-T and ETSI. Especially, V5 interface in the V series recommendations is an interface specification that provides open interfacing between an LE (Local Exchange: subscriber line exchange) and an access network device (hereinafter referred to as AN (Access Network)). LE vendors and AN vendors may make their equipment conforming to the specification, whereby free combinations of different vendors are available. Also, V5 interface includes V5.2 interface.

Figure 3:
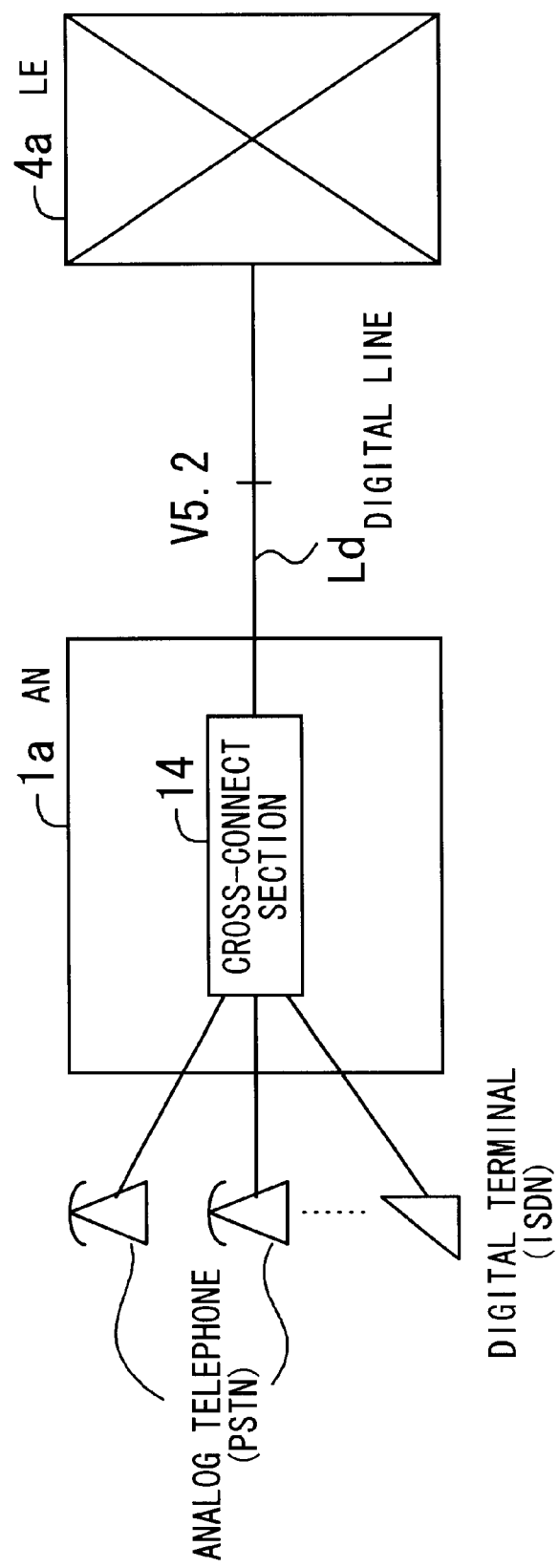
FIG. 3 is a diagram schematically showing a system configuration of a V5.2 interface.

FIG. 3 schematically illustrates a system configuration of a V5.2 interface. An AN 1a and an LE 4a are interconnected by a 2 M digital line Ld (in practice, the number of connecting lines ranges from a minimum of 2 to a maximum of 16). The connection between the AN 1a and the LE 4a is implemented in conformity with the open interface specification called V5.2 interface.

The AN 1a includes a cross-connect section 14 for controlling multiplexing/demultiplexing of voices, and is connected with ISDN digital terminals (including digital telephones) as well as analog telephones, which are PSTN (Public Switched Telephone Network) subscriber terminals. PSTN is a protocol for performing call control for analog telephones.

Figure 4:
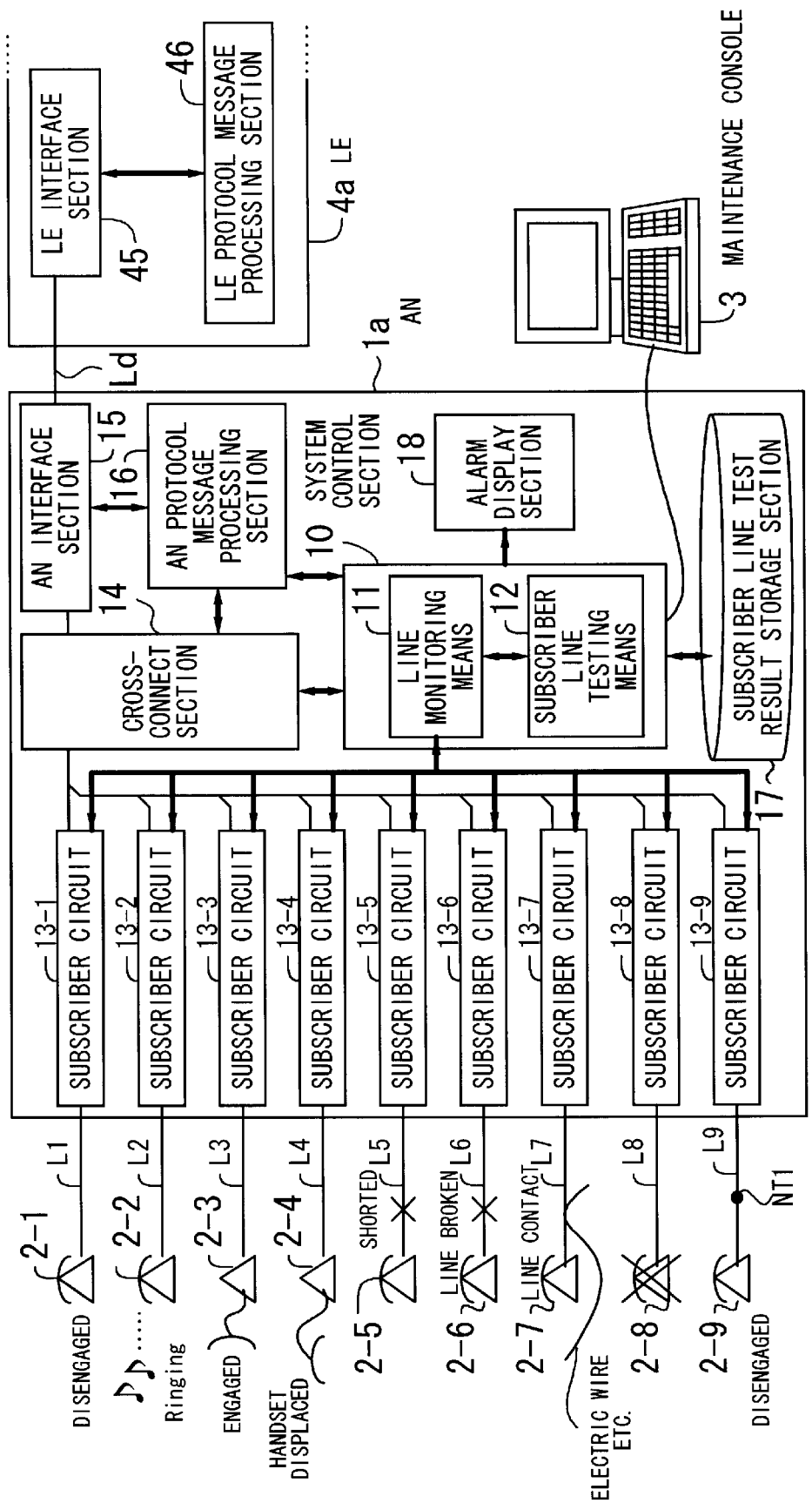
FIG. 4 is a diagram showing a configuration of an AN.

The configuration of the AN 1a according to the present invention will be now described in more detail. FIG. 4 illustrates the configuration of the AN 1a. The AN 1a is connected with analog telephones 2-1 to 2-8 through lines (PSTN subscriber lines) L1 to L8, respectively, as well as with a digital telephone 2-9 through a line L9 (via NT1 of a DSU). Also, the AN 1a is connected to the LE 4a through the V5.2 digital line Ld, as well as to the maintenance console 3. In the figure, arrow-headed thick solid lines indicate control system lines.

In the AN 1a, subscriber circuits 13-1 to 13-9 perform subscriber interface control for the respective telephones 2-1 to 2-9. The cross-connect section 14 multiplexes voices from the telephones 2-1 to 2-9 and outputs the multiplexed voice data to the LE 4a. Also, the cross-connect section demultiplexes voice data received from the LE 4a and outputs the demultiplexed voice to a corresponding one of the subscriber circuits 13-1 to 13-9.

An AN interface section 15 performs, via the line Ld, V5.2 interface control with respect to the LE 4a. An AN protocol message processing section 16 processes V5.2 protocol messages for the AN.

A system control section 10 includes the line monitoring means 11 and the subscriber line testing means 12, and controls individual sections constituting the AN 1a. A subscriber line test result storage section 17 stores the results of subscriber line testing conducted by the subscriber line testing means 12. An alarm display section 18 displays the results of subscriber line testing by means of LEDs etc.

In the LE 4a, an LE interface section 45 performs, via the line Ld, V5.2 interface control with respect to the AN 1a. An LE protocol message processing section 46 processes V5.2 protocol messages for the LE.

To the AN 1a are connected the telephones 2-1 to 2-9 in various states via the lines L1 to L9, respectively. The line states will be explained first.

The telephone 2-1 is in a disengaged state. Accordingly, for the line L1, the loop information T1 is "Open" and the status information T2 is "0", so that the line state T3 is the state #1 indicating "Idle".

The telephone 2-2 is in a ringing state. In the case of the line L2, therefore, the loop information T1 is "Open" and the status information T2 is "1", so that the line state T3 is the state #4 indicating "Busy (Ringing)".

The telephone 2-3 is in an engaged state. Thus, in the case of the line L3, the loop information T1 is "Close" and the status information T2 is "1", so that the line state T3 is the state #2 indicating "Busy".

The telephone 2-4 is in a state in which the handset is displaced. Accordingly, for the line L4, the loop information T1 is "Close" and the status information T2 is "0", so that the line state T3 is the state #3 indicating a fault.

The telephone 2-5 is in a state in which the line L5 is shorted. In the case of the line L5, therefore, the loop information T1 is "Close" and the status information T2 is "0", so that the line state T3 is the state #3 indicating a fault.

The telephone 2-6 is in a state in which the line L6 is broken. Thus, in the case of the line L6, the loop information T1 is "Open" and the status information T2 is "0", so that the line state T3 is the state #1 indicating "Idle" (The line L6 is in actuality a faulty line, but at the time of line monitoring, it is judged "Idle". The line is judged to be broken as soon as the subscriber line test is conducted).

The telephone 2-7 is in a state in which the line L7 is in contact with another electric wire or the like. In such cases, abnormal voltage of the line is detected when the line monitoring means 11 monitors the line state, so that the line is judged faulty.

The telephone 2-8 is in a state of terminal abnormality. In such cases, abnormal voltage of the line is detected when the line monitoring means 11 monitors the line state, and accordingly, the line is judged faulty.

The telephone 2-9 is in a disengaged state. Accordingly, the status information T2 is "0", so that the line state T3 is the "Idle" state #5.

The following describes how the subscriber line testing is conducted. In the case where the operator periodically conducts the subscriber line testing on the lines L1 to L9 connected to the subscriber circuits 13-1 to 13-9, the system control section 10 proceeds with the testing while determining whether or not the testing can be conducted on each line.

The operator specifies lines to be tested and starts the testing by operating the maintenance console 3, whereupon the system control section 10 starts to determine the testability from the line L1 connected to the subscriber circuit 13-1.

The line L1 is in the state #1. Accordingly, if the "Idle" state of the line L1 continues for a fixed period and thus the line is judged testable, the subscriber circuit 13-1 and the subscriber line testing means 12 are connected to each other. Subsequently, the subscriber line test is conducted, and in the illustrated example, the result is "OK". The test result data is stored in the subscriber line test result storage section 17.

The line L2 is in the state #4 and thus is judged "Busy (Ringing)". In this case, the test is deferred as the state transition is being monitored, and the next line L3 is determined as to testability.

The line L3 is in the state #2 and thus is judged "Busy (Engaged)". Also, in this case, the test is deferred as the state transition of the line is being monitored, and the next line L4 is determined as to testability.

The line L4 is in the state #3. Thus, on confirming that this state continues for a fixed period, a judgment is made that some fault has occurred, and the subscriber line test is compulsorily conducted. As a result of the test, it is found that the handset is displaced. Also, the subscriber line testing means 12 controls the telephone 2-4 via the subscriber circuit 13-4 so that a warning sound may be produced from the telephone 2-4. The test result data is stored in the subscriber line test result storage section 17.

The line L5 also is in the state #3. Accordingly, on confirming that this state continues for the fixed period, a judgment is made that some fault has occurred, and the subscriber line test is compulsorily conducted. As a result of the test, it is found that the line is shorted. The test result data is stored in the subscriber line test result storage section 17.

The line L6 is in the state #1. Accordingly, if the "Idle" state of the line L6 continues for the fixed period and thus the line is judged testable, the subscriber circuit 13-6 and the subscriber line testing means 12 are connected to each other. Subsequently, the subscriber line test is conducted, and as a result, it is found that the line is broken. The test result data is stored in the subscriber line test result storage section 17.

In the case of the line L7, abnormal voltage is detected when the line state is monitored by the line monitoring means 11, and therefore, the subscriber line test is immediately conducted. The result of the test shows that the line is in contact with a different type of wire, and the test result data is stored in the subscriber line test result storage section 17.

Also, in the case of the line L8, abnormal voltage is detected when the line state is monitored by the line monitoring means 11, and accordingly, the subscriber line test is immediately conducted. The result of the test shows terminal abnormality, and the test result data is stored in the subscriber line test result storage section 17.

To the line L9 is connected the ISDN digital telephone 2-9 via NT1. When testing this line, the status information T2 is monitored, and if the line is in the connected (1) state, the test is deferred until the state changes to the released (0) state. Upon transition of the state to the released (0) state, the line state is monitored for a fixed period, and if it is judged that the line remains "Idle", the line is controlled so as to restrain call origination and acceptance (maintenance mode) and then the subscriber line test is conducted. After the test result data is stored in the subscriber line test result storage section 17, the line is released from the maintenance mode into the normal "Idle" state.

In the case of the lines L2 and L3 with respect to which the testing has been deferred, when the line state has changed to the "Idle" state after termination of the subscriber's call or the like, the line is again determined as to testability, and if the "Idle" state continues for the fixed time and thus it is judged that the line is testable, the test is started.

On the other hand, the lines L4 to L8 have been judged faulty as a result of the testing, and the faults discovered can be displayed at the alarm display section 18 by means of LEDs or the like, using different colors according to fault levels. Further, the operator can make all test results displayed on screen whenever necessary by operating the maintenance console 3.

Also, the settings for the sequence of subscriber line testing, such as the lines to be tested, test start time and time interval for testing, can be made in advance through the maintenance console 3. Thus, the operator has only to make settings and start the testing, whereupon the testing is automatically conducted. After all tests are finished, the operator can view the data.

As described above, with the communication device and access network device according to the present invention, it is possible to monitor the conditions of use of lines utilizing a V5.2 interface and discover faults early. Also, PSTN and ISDN subscriber lines utilizing a V5.2 interface can be tested without affecting their conditions of use.

Further, maintenance work accompanying periodic testing, which has hitherto be carried out by the operator in the nighttime, can be automatically repeated at regular intervals regardless of the daytime or nighttime, whereby the operating states of subscriber transmission devices can be detected efficiently and also the subscriber lines can be efficiently maintained.

As described above, in the communication device according to the present invention, line states are monitored based on at least one of the loop information of lines and the status information of bearer channels and the subscriber line testing is conducted in accordance with the line states. This makes it possible to accurately detect the line states and to efficiently test the subscriber lines, whereby the reliability and quality of maintenance and operation can be improved.

Also, in the access network device according to the present invention, line states are monitored based on at least one of the loop information of lines and the status information of bearer channels and the subscriber line testing is conducted in accordance with the line states. This makes it possible to accurately detect the line states and to efficiently test the subscriber lines, whereby the reliability and quality of maintenance and operation can be improved.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communication device for testing subscriber lines, comprising:

line monitoring means for monitoring line states based on at least one of loop information of lines and status information of bearer channels; and subscriber line testing means for conducting subscriber line testing in accordance with the line states, wherein said subscriber line testing means conducts the subscriber line testing while regarding, as a faulty line, a line which is in a connected state and also the bearer channel of which is in a released state.

2. The communication device according to claim 1, wherein, if, as a result of the subscriber line testing, displacement of a handset of a subscriber terminal is detected, the subscriber line testing means causes the subscriber terminal to emit a warning sound.

3. The communication device according to claim 1, wherein the communication device is connected to a maintenance console for setting/controlling the subscriber line testing and displaying results of the subscriber line testing.

4. The communication device according to claim 1, wherein the line monitoring means and the subscriber line testing means automatically repeat a series of processes including the line state monitoring, the subscriber line testing, and storage of results of the subscriber line testing.

5. An access network device having a V5 interface and capable of testing subscriber lines, comprising:

line monitoring means for monitoring line states based on at least one of loop information of lines and status information of bearer channels; and subscriber line testing means for conducting subscriber line testing in accordance with the line states, wherein said subscriber line testing means conducts the subscriber line testing while regarding, as a faulty line, a line which is in a connected state and also the bearer channel of which is in a released state.

6. The access network device according to claim 5, wherein, if, as a result of the subscriber line testing, displacement of a handset of a subscriber terminal is detected, the subscriber line testing means causes the subscriber terminal to emit a warning sound.

7. The access network device according to claim 5, wherein the access network device is connected to a maintenance console for setting/controlling the subscriber line testing and displaying results of the subscriber line testing.

8. The access network device according to claim 5, wherein the line monitoring means and the subscriber line testing means automatically repeat a series of processes including the line state monitoring, the subscriber line testing, and storage of results of the subscriber line testing.

* * * * *